United States Patent
Kirikera et al.

(10) Patent No.: US 9,506,340 B2
(45) Date of Patent: Nov. 29, 2016

(54) DOWNHOLE QUARTZ GAUGE WITH MINIMAL ELECTRONICS

(71) Applicant: Sercel-GRC Corporation, Tulsa, OK (US)

(72) Inventors: Goutham R. Kirikera, Tulsa, OK (US); William M. Patton, Tulsa, OK (US); Suzanne M. Behr, Tulsa, OK (US); Tracy Sawyer, Tulsa, OK (US); Anthony Thornberry, Tulsa, OK (US)

(73) Assignee: Sercel-GRC Corporation, Tulsa, OK (US)

(*) Notice: Subject to any disclaimer, the term of this patent is extended or adjusted under 35 U.S.C. 154(b) by 260 days.

(21) Appl. No.: 14/209,260

(22) Filed: Mar. 13, 2014

(65) Prior Publication Data

US 2014/0311235 A1 Oct. 23, 2014

Related U.S. Application Data

(60) Provisional application No. 61/784,614, filed on Mar. 14, 2013.

(51) Int. Cl.

| E21B 47/06 | (2012.01) |
|---|---|
| G01L 9/00 | (2006.01) |
| G01L 19/00 | (2006.01) |
| G01H 13/00 | (2006.01) |
| E21B 47/00 | (2012.01) |
| G01H 11/06 | (2006.01) |
| G01V 1/44 | (2006.01) |

(52) U.S. Cl.
CPC ............... *E21B 47/06* (2013.01); *E21B 47/00* (2013.01); *E21B 47/065* (2013.01); *G01H 13/00* (2013.01); *G01L 9/0022* (2013.01); *G01L 19/0092* (2013.01); *G01H 11/06* (2013.01); *G01V 1/44* (2013.01)

(58) Field of Classification Search
CPC ...... E21B 47/06; E21B 47/00; E21B 47/065; G01H 13/00; G01H 11/06; G01L 9/0022; G01V 1/44
See application file for complete search history.

(56) References Cited

U.S. PATENT DOCUMENTS

| 4,724,381 | A | * | 2/1988 | Crimmins | G01R 15/26 324/127 |
|---|---|---|---|---|---|
| 6,121,894 | A | * | 9/2000 | Yankielun | G01N 17/00 340/870.31 |
| 6,157,215 | A | * | 12/2000 | Gabara | H03K 19/0005 326/30 |
| 7,299,678 | B2 | * | 11/2007 | Atherton | E21B 47/06 73/24.01 |
| 2008/0289408 | A1 | * | 11/2008 | Adnan | E21B 43/14 73/152.12 |
| 2012/0211278 | A1 | * | 8/2012 | Gonzalez | E21B 47/06 175/40 |

FOREIGN PATENT DOCUMENTS

| GB | 2064127 A | 6/1981 |
|---|---|---|
| WO | 9326115 A2 | 12/1993 |
| WO | 0173380 A1 | 10/2001 |
| WO | 2011066188 A1 | 6/2011 |

\* cited by examiner

*Primary Examiner* — Paul West
(74) *Attorney, Agent, or Firm* — GableGotwals (57) ABSTRACT

A system and method of monitoring a pressure, temperature, and/or vibration of a hostile environment without requiring the use of active electronics or an oscillator circuit in that environment. The system and method interrogate a resonant pressure sensor and a resonant or passive temperature sensor connected to a transmission line and located at least 100 feet (30.48 m) away from a network analyzer. The system and method use the reflected frequencies from the sensors to determine the pressure, temperature, and/or vibration. If the sensors are networked by the transmission line or a network filter, the reflected portion can include the reflected transmission energy. The applied signal and reflected portion travel along the transmission line, which is preferably impedance matched to that of the system. If a multi-conductor cable is used, the effects of the cable's length and temperature are compensated for via a system calibration when in field use.

22 Claims, 11 Drawing Sheets

DOWNHOLE QUARTZ GAUGE WITH MINIMAL ELECTRONICS

CROSS-REFERENCE TO PENDING APPLICATIONS

This application claims priority to U.S. Pat. Appl. Ser. No. 61/784,614, filed Mar. 14, 2013, the subject matter of which is hereby incorporated by reference.

BACKGROUND OF THE INVENTION

This invention generally relates to instruments used by the downhole industry to determine pressure and temperature. More specifically, the invention relates to quartz-based instruments used by the downhole industry to determine pressure and temperature.

Existing quartz-based instruments used by the downhole industry utilize systems with multiple quartz resonating elements to determine pressure and temperature. Typically, such systems consist of one pressure sensor (responsive to both pressure and temperature), one reference sensor (exposed to temperature and isolated from pressure) and one temperature sensor (exposed to temperature and isolated from pressure). The reference sensor is less sensitive to temperature as compared to the temperature sensor.

Figure 1:
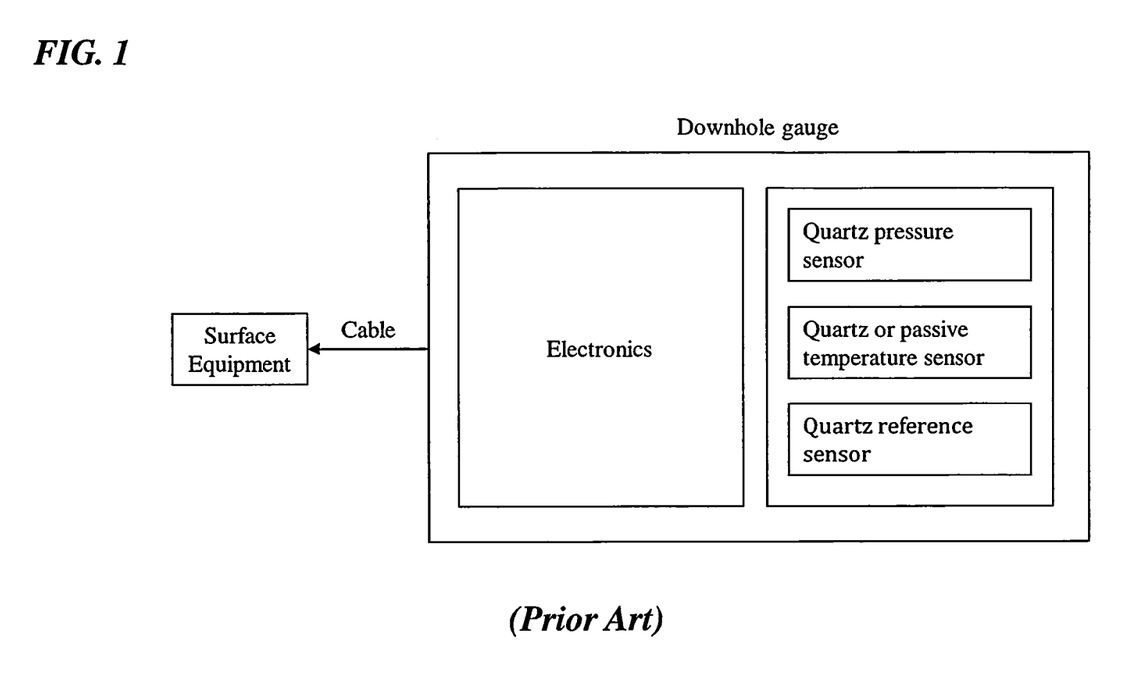
FIG. 1 is a block diagram of existing instruments used to monitor pressure and temperature of subterranean well.

Using mixer oscillators (see e.g., U.S. Pat. No. 5,166,645) the signals from the sensors are processed and the resulting data is either stored on a memory chip on board the gauge or is sent uphole through a power cable or a tubing encapsulated conductor ("TEC") cable to the surface equipment (see FIG. 1). There are a large number of electronic components which have to survive high temperatures downhole, making the gauge expensive as well as prone to failures in the field.

SUMMARY OF THE INVENTION

A system and method made according to this invention successfully communicates with a downhole quartz gauge capable of measuring pressures and temperatures with no active downhole electronic components and using only passive electronic components to no electronic components downhole. Because the number of downhole electronic components is significantly less compared to existing quartz gauges available in the industry, the system and method greatly increases the reliability of the gauge.

The system and method eliminate the downhole mixers and oscillators used in traditional quartz gauges and communicate the signals directly to the surface by way of a transmission line, preferably, a single- to multi-conductor, tubing encapsulated conductor ("TEC") cable or its equivalent. The advantage of this system and method is that it limits the number of electronic components that see harsh subterranean temperature conditions and hence improves the reliability of this system especially at high temperature. The supporting electronics, which include active electronic components, are located on the surface where the environmental conditions are not as harsh as the downhole subterranean conditions.

A typical application for the system and method would be a steam-assisted gravity drainage well ("SAGD") having a depth of 2,000 feet (609.6 m), a pressure of 3,000 psi (about 20.7 MPa), and a temperature of 230° C. Other applications could have greater depths and see temperatures as high as 250° C. and pressures of 15,000 psi (about 103.4 MPa).

A system for, and method of, monitoring pressure, temperature, and/or vibration includes a network analyzer, at least one resonant sensor, and a transmission line connecting the network analyzer to the resonant sensor. The resonant sensor can be a quartz pressure or temperature sensor or its equivalent (including sensors such as a gap capacitance sensor). The network analyzer includes an oscillating signal generator, which could be an RF sinusoidal signal generator, and a signal detector.

The transmission line is at least 100 feet (30.48 m) in length and can be a single-conductor transmission line or a multi-conductor transmission line. A tubing encapsulated conductor ("TEC") cable provides a suitable transmission line. To lower losses along the cable, the dielectric area between the inner cable conductor and the outer diameter of the shield should be as large as possible.

The network analyzer applies an incident energy in the form of an oscillating signal along the transmission line and frequency sweeps the oscillating signal from one reference frequency to another reference frequency across the resonant sensor. The expected resonance of the resonant sensor lies between the two reference frequencies;

The network analyzer then receives a reflected portion of the incident energy from the resonant sensor being passed back along the transmission line, measures a phase and magnitude of the received reflected portion of the incident energy; and identifies a change in the received reflected portion of the incident energy across the swept frequencies. When an additional resonant sensor is used and connected to another resonant sensor by way of a transmission line or network filter, the reflected portion of the incident energy can include the reflected transmitted energy (S12) in addition to the reflection coefficient (S11).

The system may also include means for increasing the reflected portion of the incident energy relative to the applied incident energy. In one embodiment, the increasing means is a fixed resister which substantially matches system impedance load.

To measure temperature, the system can include the use of a passive temperature sensor or a resonant temperature sensor. Regardless of which type of sensor is used, the sensor is connected to the network analyzer by the transmission line. When a passive temperature sensor is connected to a single-conductor transmission line, an isolation circuit allows the temperature sensor to see only positive DC current and a system impedance match load only sees negative DC current. When a resonant temperature sensor is connected to the single-conductor transmission line, it is connected in parallel to the resonant pressure sensor, thereby permitting the network analyzer to sweep both sensors at the same time.

Objectives of the invention include providing a system and method for measuring pressure and temperature of a subterranean well that (1) is more reliable than existing systems and methods; (2) limits the number of electronic components and circuits both overall and those exposed to harsh subterranean conditions; (3) eliminates the mixers and oscillators used in traditional quartz gauges; (4) transmits the reflected natural resonant frequencies of the quartz pressure and temperature sensors directly to the surface; and (5) provides for multiple pressure and temperature well zones.

BRIEF DESCRIPTION OF THE DRAWINGS

Frequency information from sensors is modified by downhole electronics. This modification typically includes over 100 components such as capacitors, diodes, inductors, transistors, resistors, and integrated circuit chips. These components perform the function of oscillating, mixing, amplifying, switching, supplying power to process the signals. All these electronics are exposed to downhole temperature. The signal travels through a power cable or tubing encapsulated conductor ("TEC") cable to the surface equipment.

ELEMENTS AND NUMBERING USED IN THE DRAWINGS

11 Controller
13 Control data bus
15 Single conductor transmission line (e.g., a single-conductor TEC cable)
17 Multi-conductor transmission line (e.g., a multi-conductor TEC cable)
17A First conductor of 17
17B Second conductor of 17
17C Third conductor of 17
17D Fourth conductor of 17
17E Fifth conductor of 17
19 Surface equipment
21 Downhole sensors
23 Network analyzer
25 Signal generator
27 RF detector
29 Directional coupler
31 Bias-T (or bias-tee)
33 Direct current ("DC") power supply
35 Passive temperature sensor
37 Fixed resistor
39 Noise filter
41 Resonant pressure sensor (e.g., quartz pressure crystal)
43 Resonant temperature crystal (e.g. quartz temperature crystal)
45 RF selector switch or switching device
47 DC ammeter
49 Low pass filter ("LPF") diode switch (isolation circuit)
51 Open load
53 Shorted load

DETAILED DESCRIPTION OF THE PREFERRED EMBODIMENTS

Definitions

The following definitions are used when describing the preferred embodiments.

Controller 11: a single board computer or similar controller that controls all equipment, stores data that is collected, stores and utilizes calibration data for the system.

Control data bus 13: a method of communicating with all equipment on a single cable to all equipment. A universal serial bus ("USB") is an example of control data bus 13.

RF: Radio frequency.

Tubing encased or encapsulated conductor ("TEC") cable 15, 17: cable having one to several internal conductors. The TEC cable is an example of a transmission line. The transmission line is exposed to pressure of at least 100 psi (689.5 KPa) and temperature of at least 30° C.

Surface equipment 19: electronic and mechanical equipment located above ground level.

Downhole sensors 21: electronic and mechanical equipment located below ground level and used to detect pressure, temperature, and/or vibration.

Network analyzer 23: electronic equipment that is used to measure electronic network parameters including frequency, magnitude, and phase of a sensor. Measurements can be one of several types depending on the coupling to the sensor. The analyzer 23 includes a signal generator 25 and an RF detector 27. One example of a network analyzer 23 is a sine wave generator with controlled amplitude and an RF detector (e.g., a SAUNDERS™ network analyzer (Saunders & Associates, LLC, Phoenix, Ariz.)).

Directional coupler 29: device that connects to a network analyzer 23 to lightly couple energy to the sensor. The directional coupler 29 allows measurement of incident and reflected signals of the sensor. S11 and S12 parameter measurement is possible with a two- or four-port coupler.

Bias-T (or bias-tee) 31: Device that allows for combining and isolating DC and RF signals.

Noise filter 39: electronic filter that removes unwanted frequencies from the signal of interest. Types used may be low-pass, band-pass, high-pass, and notch filters.

Resonant sensor or quartz crystals 41, 43: device that exhibits electrical changes based on pressure, temperature, and/or vibration. A quartz crystal is one example of a resonant sensor; a gap capacitance sensor is another. The expected resonance of the resonant sensor can be any resonance practical for the measurement application. Preferably, the resonant frequency is as low as possible because the lower the resonant frequency, the easier it is to detect the reflected signal.

RF selector switch 45: switching device controlled by the controller 11 to select one to many conductors of the cable 15, 17 for analysis by the network analyzer 23.

S11 and S12: Two of four scattering parameters used by analysis to determine characteristics of connected loads. The parameters are used to measure the input-reflected power from the sensor. This information is used to determine the resonant frequency of the crystal 41, 43. S11 is the reflection coefficient defined as reflected energy divided by the incident energy. S12 is the reverse transmission coefficient defined as the reverse transmitted energy divided by the incident energy. S12 is used in the case of multiple sensors with a transmission line for network, or a network filter, between them. The reflected portion of the incident energy can include the reverse transmitted energy.

Figure 2:
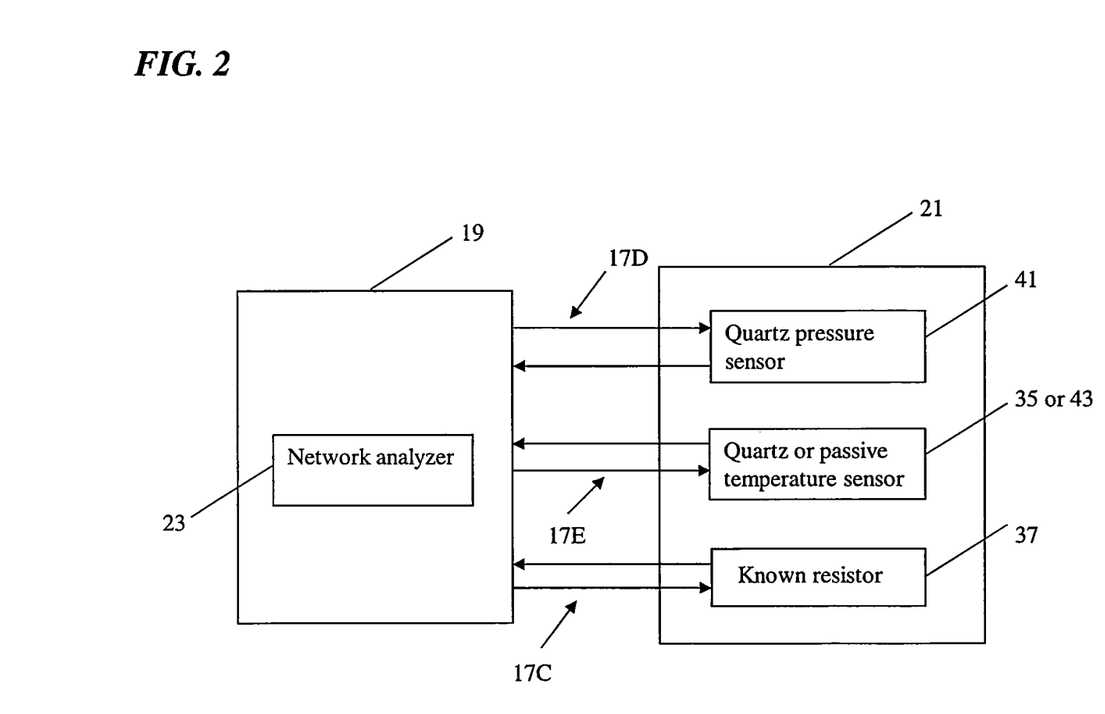
FIG. 2 is a block diagram of a preferred embodiment of a system and method made according to this invention and used to monitor pressure and temperature of a subterranean well. The system eliminates the quartz reference sensor and mixers and oscillators used downhole in traditional quartz gauges and transmits the reflected natural resonant frequencies of the crystal directly to the surface on a multi-conductor, TEC cable as a transmission line. The system also makes use of real-time system calibration.
Figure 3:
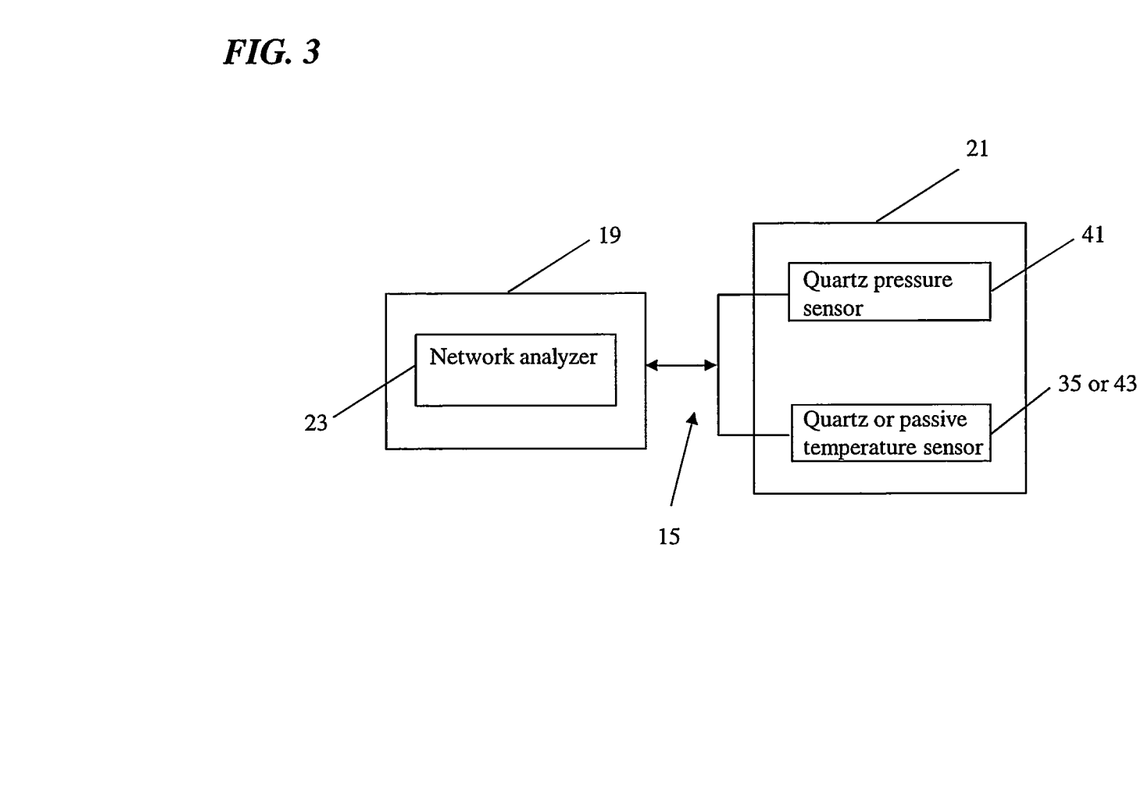
FIG. 3 is a block diagram of one preferred embodiment of the system configured for use with a single-conductor TEC cable. The system and method use a pressure crystal and a temperature crystal, or could include the use of a resistive temperature device ("RTD") in place of the temperature crystal.

Referring now to FIGS. 2 and 3, a preferred embodiment system and method made according to this invention makes use of the concept of S-parameters and, more specifically, S11 and S12 measurements of a swept signal that propagates through a transmission line, preferably a TEC cable 15, 17, and into a load (e.g. a sensor) to determine pressure and temperature of the subterranean well.

In some preferred embodiments, pressure and temperature are determined by measurement of quartz self-resonant frequencies. In other preferred embodiments, temperature is determined by measurement of a passive temperature sensor instead of a quartz sensor. The resonant frequencies are determined by sweeping a pre-selected frequency range with a network analyzer 23 located at the surface. A directional coupler 29 and the RF detector 27 of a network analyzer 23, each located at the surface, are used to measure the S11 and S12 signals. The quartz crystal 41, 43 is not part of an oscillator circuit and minimal to no electronic components are required downhole. The crystal 41, 43 is connected to the network analyzer by way of a transmission line which is at least 100 feet (30.48 m) in length. In a typical application, the transmission line is exposed to an environment having pressure of at least 100 psi (689.5 KPa) and temperature of at least 30° C.

Operation and Calibration of the System

Multi-Conductor Transmission Line

Figure 4:
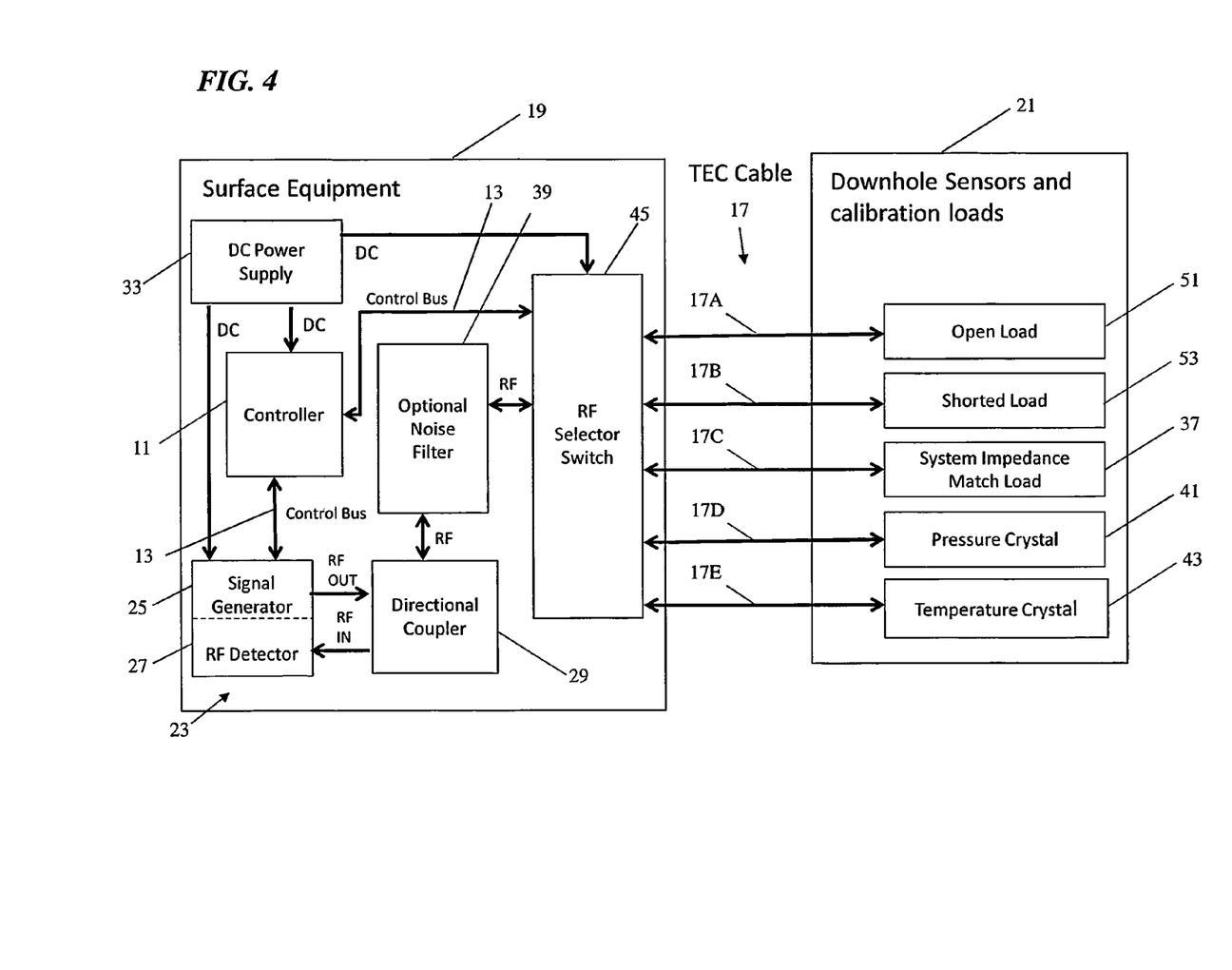
FIG. 4 is a block diagram of an alternate preferred embodiment of the system and method configured for use with a multi-conductor TEC cable. The system and method make use of a pressure crystal and a temperature crystal.
Figure 5:
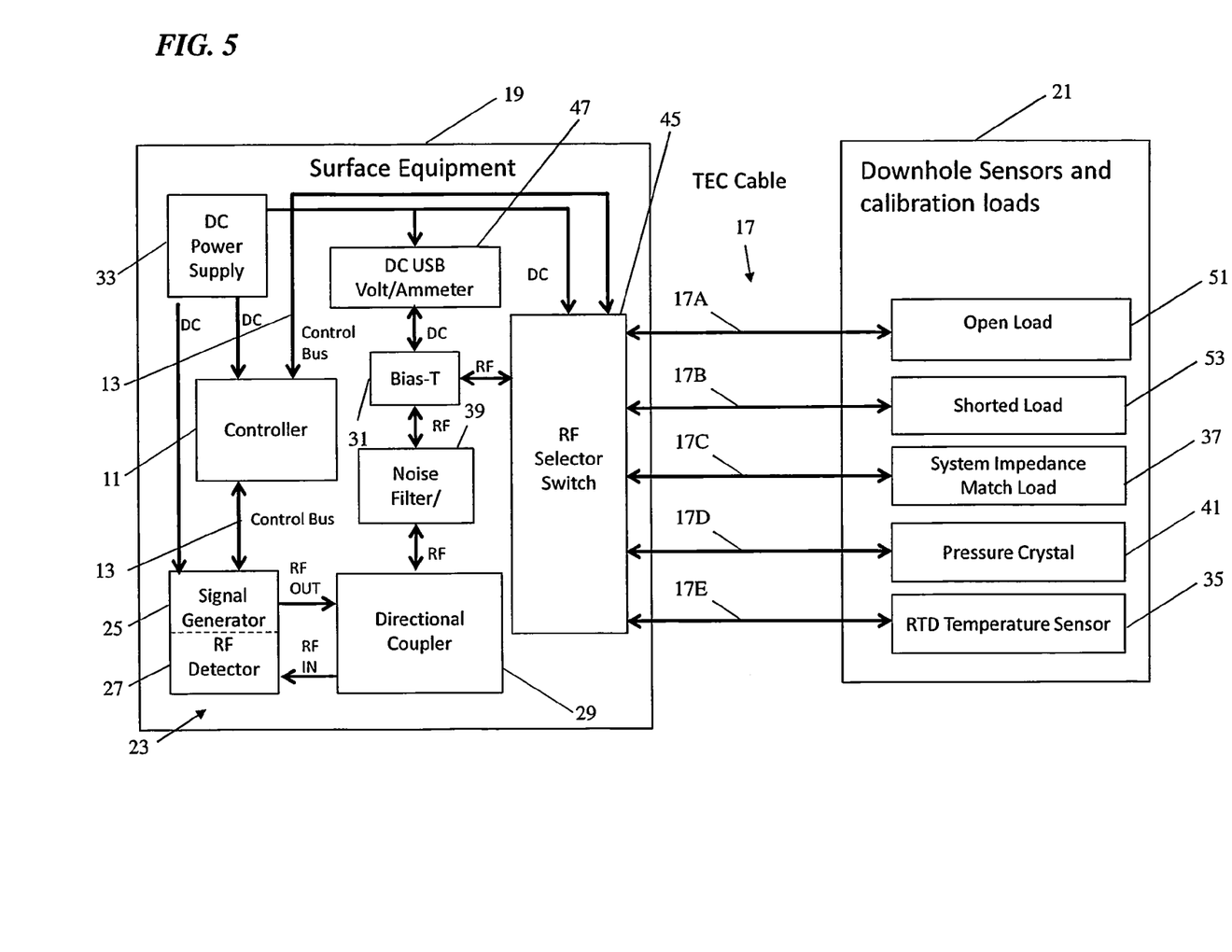
FIG. 5 is a block diagram of another preferred embodiment of the system configured for use with a multi-conductor TEC cable. The system and method make use of a pressure crystal and a passive temperature sensor (e.g., a resistive thermal device or RTD).

Referring now to FIGS. 2, 4, and 5, in one preferred embodiment of the system and method a multi-conductor TEC cable 17 is used as explained below.

1. The multi-conductor TEC cable 17 operates as follows:
   (a) A first conductor (see element 17A, FIGS. 4 & 5) of the cable 17 is left open (open load 51).
   (b) A second conductor (see element 17B, FIGS. 4 & 5) of the cable 17 is shorted downhole to the ground (outside steel encapsulation) (shorted load 53).
   (c) A third conductor 17C of the cable 17 is attached to a system impedance match load 37, which is stable under temperature and does not change its value with a temperature change. This system impedance match load 37 is preferably a fixed value resistor used as an RTD-STD that matches the impedance of the cable 17.
   (d) A fourth conductor 17D of the cable 17 is attached to a resonant sensor such as a quartz pressure crystal 41 or its equivalent, which is used to measure the pressure of the subterranean well. The crystal 41 will respond to both pressure and temperature.
   (e) A fifth conductor 17E of the cable is connected to another resonant sensor such as a quartz temperature crystal 43 (see FIG. 4) or to a passive temperature sensor 35 such as an RTD (see FIG. 5) to measure the temperature of the subterranean well. The crystal 43 or passive temperature sensor 35 will be exposed to only temperature and is protected by a mechanical housing (not shown) which isolates it from pressure.

2. The surface equipment 19 operates as follows:
   (a) The multi-conductor TEC cable 17 is connected to an RF selector switch 45 which is connected to the network analyzer 23.
   (b) The RF selector switch 45 consists of electronics, such as relays, which aid in connecting the appropriate conductor 17A-E of the cable 17 to the network analyzer 23.

3. Collecting and analyzing data from downhole sensors 21 occurs as follows:
   (a) The RF selector switch 45 connects the first conductor 17A (the open) of the cable 17 to the network analyzer 23. The network analyzer 23 sweeps the cable 17 at various frequencies. The span of the frequency sweep, along with the start and end frequencies, are dependent on the quartz pressure and temperature sensors' 41, 43 natural resonances. Signals arrive at the end of the first conductor 17A of the cable 17. These signals are reflected back to the surface from the open conductor. The phase of the signals received back on the surface is different than the previous scenario (see 3a above). The collected signals are analyzed by the network analyzer 23 and data is stored in the controller 11.
   (b) The RF selector switch connects the second conductor 17B (the short) to the cable 17 network analyzer 23. The network analyzer 23 sends the same signals and span as in step 3a. These signals travel through the cable 17 and reflect at the end of the second conductor which is shorted. The impedance mismatch caused at the end of the cable 17 reflects the signals back to the surface equipment 19. The collected signals are analyzed by the network analyzer 23 and data is stored in the controller 11.
   (c) The RF selector switch 45 connects the third conductor 17C (the fixed resistor value) of the cable 17 to the network analyzer 23. The network analyzer 23 repeats the same steps of sweeping the cable 17 at various frequencies. Signals received on the surface have different characteristics compared to steps 3*a* and 3*b* above. The collected signals are analyzed by the network analyzer 23 and data is stored in the controller 11.

(d) Software of a kind known in the art and provided with the network analyzer 23 uses data from steps 3*a*, 3*b* and 3*c* above to perform a system calibration and remove the effect of the cable 17 on the quartz sensors 41, 43. The temperature effects are removed by the system impedance match load 37.

(e) The RF selector switch 45 connects to the fourth conductor 17D of the cable 17 which connects to the quartz pressure sensor 41. The network analyzer 23 sweeps the fourth conductor 17D at various frequencies. The reflected signals received at the surface are a function of downhole pressure, temperature, and the cable's 17 length and temperature. The effect of the cable's 17 length and temperature is compensated by the calibration performed in step 3*d* above.

(f) The RF selector switch 45 connects to the fifth conductor 17E of the cable 17 to obtain information from the passive temperature sensor 35. If a quartz temperature sensor 43 is used (see FIG. 4), then the system and method works the same as step 3*e* above for the quartz pressure sensor 41. If a passive temperature sensor 35 is used (e.g. an RTD; see FIG. 5), then the downhole resistance of the passive temperature sensor 35 is determined by applying a voltage and measuring the current of the device at the surface, in addition to measuring the current on the system impedance matched load 37 to compensate for cable 17 losses.

Single-Conductor Transmission Line

Figure 6:
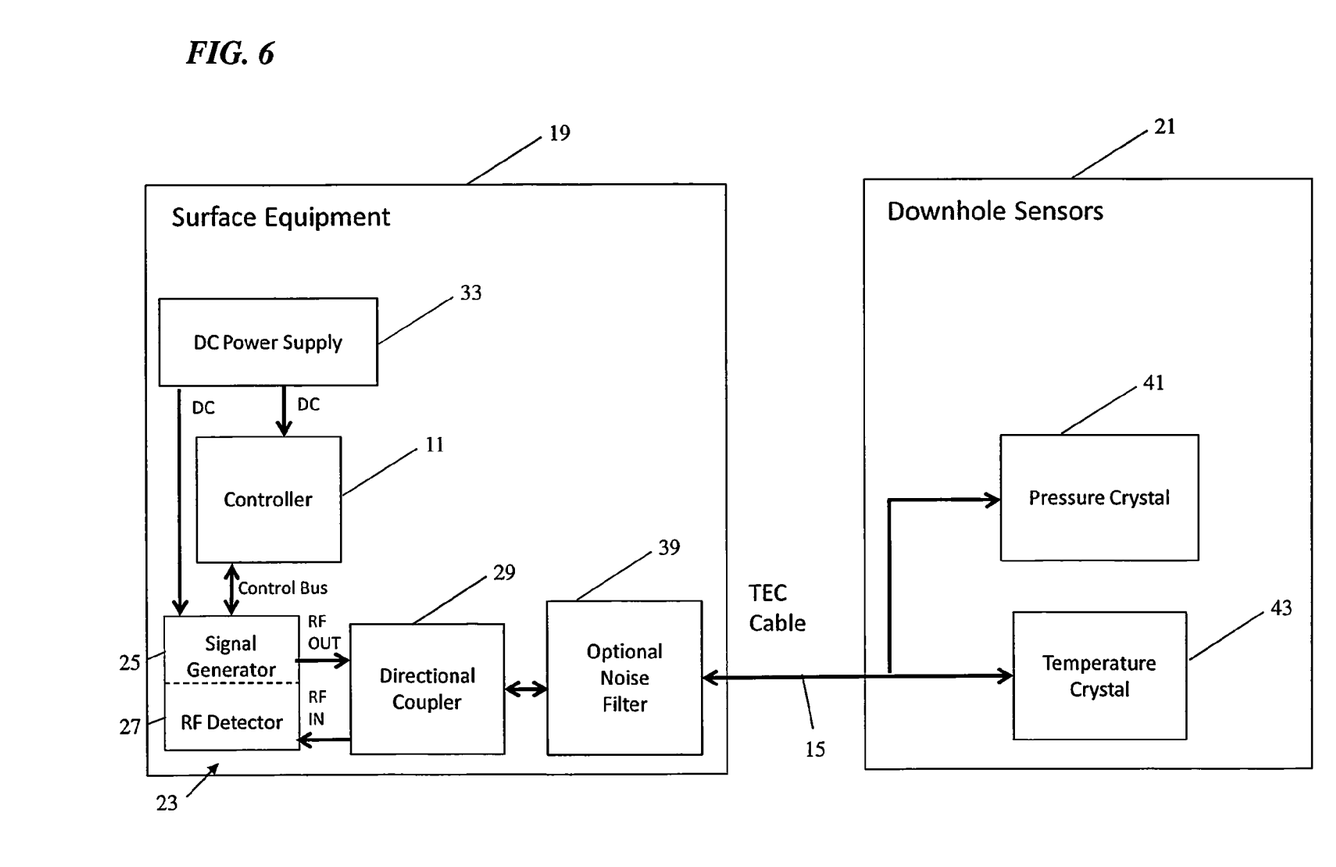
FIG. 6 is a block diagram of another preferred embodiment of the system and method configured for use with a single-conductor TEC cable. The system and method include a pressure crystal and temperature crystal connected in parallel to the cable.

Referring now to FIGS. 3 and 6, in another preferred embodiment of the system and method a single conductor TEC cable 15 is used as explained below.

1. The single-conductor TEC cable 15 operates as follows:
   (a) The outer conductor (shield) of cable 15 is connected to ground. The center conductor of the cable 15 is connected to both the pressure and temperature crystals 41, 43 that are connected between the center conductor 15B and the shield 15A of the cable 15.
   (b) The impedance of the cable 15 is matched to the driving impedance to limit reflections due to load mismatch of the cable 15.
   (c) General system impedance is matched as close as possible to the resonant impedance of the pressure and temperature crystals 41, 43 at resonance to limit signal reflections and eliminate the need for system calibration after installation. Cable and system calibration when in use is eliminated because the impedance of cable 15 is matched to the system impedance.

2. The surface equipment 19 operates as follows:
   a) The single-conductor TEC cable 15 is connected directly to a network analyzer 23.

3. Collecting and analyzing data from downhole sensors 21 occurs as follows:
   (a) The network analyzer 23 connects to the center conductor 15B of the TEC cable 15 and must be matched to the impedance of the cable 15. The opposite end of the cable 15 is connected to the pressure and temperature crystals 41, 43. This allows the network analyzer 23 to frequency sweep the cable 15 and sensors 41, 43. The reflected signals received by the network analyzer 23 are a function of downhole pressure and temperature.
   (b) The reflected signals are the natural resonant frequencies of the downhole pressure and temperature crystals 41, 43 and are used along with the sensor calibration curves to determine the downhole pressure and temperature.

Preferred Arrangements

Following are additional technical descriptions for the four preferred arrangements for downhole pressure and temperature measurement related to embodiments illustrated in FIGS. 4 to 7. These arrangements allow for very high temperature and pressure measurements by limiting or reducing the number of active electronic components. All of the embodiments have the same result, that is, measurement of downhole pressure and temperature (and could, using similar methods, include measurement of vibration). The common operation of the embodiments is described below.

Downhole pressure is measured by a resonant sensor such as a quartz pressure crystal 43 (or its equivalent) using the S-parameter reflective method (i.e., frequency resonance sweep measurement via a network analyzer or an equivalent method). Resonance of the crystal 41 changes with application of pressure and temperature. Because both pressure and temperature affect the measurement, the temperature frequency is used along with the pressure frequency to calculate the downhole pressure. Downhole temperature is measured by a quartz temperature crystal 43 using the S-parameter reflective method or a passive temperature sensor 35.

When using a multi-conductor transmission line such as TEC cable 17, cable impedances are removed from the calculation by pre-determining the phase and magnitude relationship of the line, which is preferably done using a system calibration load/open/short method. Impedance differences between the conductors are negligible.

Referring now to FIGS. 4 and 5, the controller 11 operates the network analyzer 23. The network analyzer 23 simultaneously transmits and receives an oscillated signal. One example of this type of signal is a sinusoidal RF signal. (In this and all cases described herein, the source signal is preferably a fixed amplitude oscillated signal.) The signal generator 25 of the network analyzer 23 transmits the signal via the RF OUT connector and the RF detector 27 receives RF signals on the RF IN connector.

The directional coupler 29 is connected to the RF OUT and RF IN connectors of the network analyzer 23 and, in the case of a passive temperature sensor 35 (see FIG. 5) provides a pass-thru connection to the bias-T 31. The bias-T 31 allows the DC signal to be added to the RF signal that is connected to the TEC cable 17 that acts as the conduit for the downhole temperature passive sensor 35 and system impedance match load 37. A noise (band pass) filter 39 may be used to remove noise that is coupled onto the cable 17. The noise is caused by environmental disturbances.

The RF selector switch 45 connects the RF signal to one of the five conductors 17A-E of the TEC cable 17. The RF selector switch 45 is operated by the controller 11. The switch 45 allows the network analyzer 23 to analyze each downhole load independently. A DC power supply 33 powers the controller 11, network analyzer 23, and RF selector switch 45.

Figure 7:
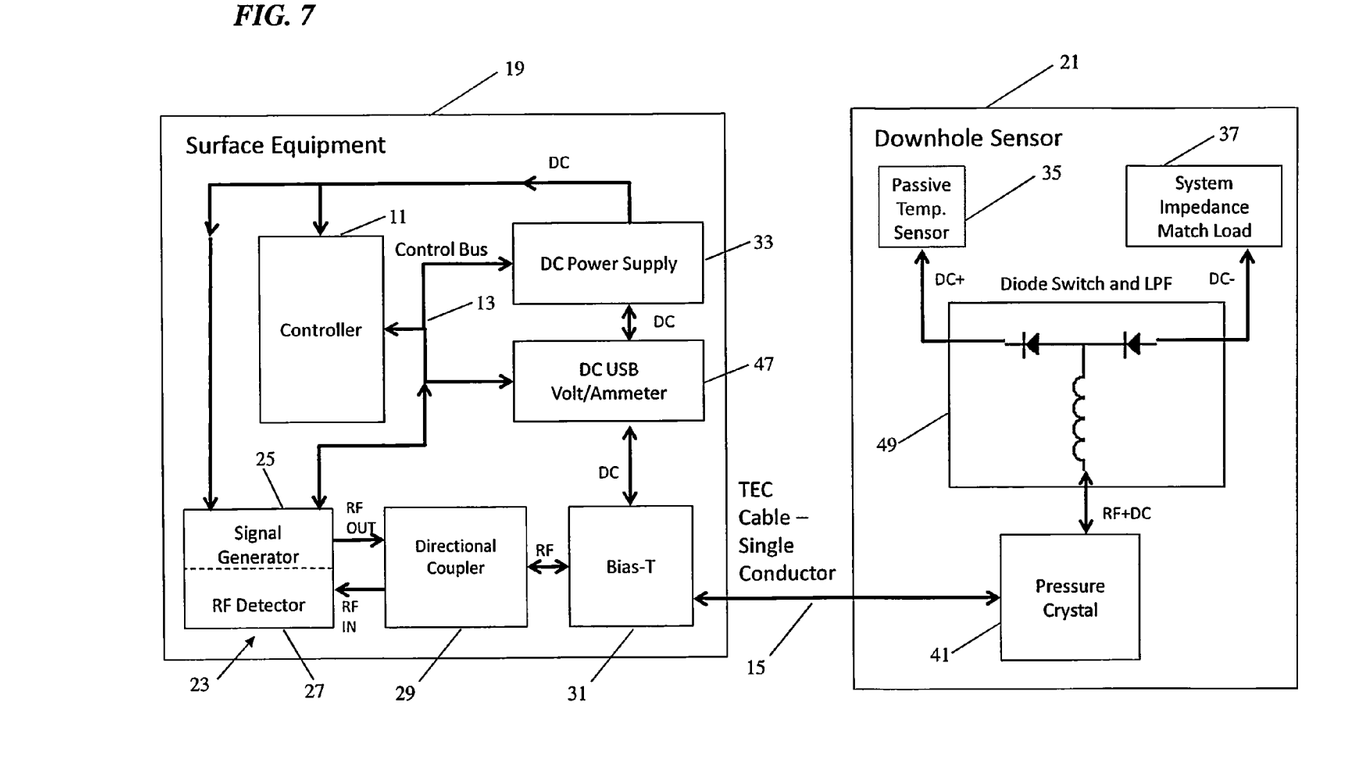
FIG. 7 is a block diagram of a preferred embodiment of the system and method configured for use with a single-conductor TEC cable. The system and method include a pressure crystal and a passive temperature sensor (e.g. a resistive thermal device or "RTD") and a fixed resistor used as a standard for the passive temperature sensor (e.g., "RTD-STD").

Referring now to FIGS. 6 and 7, the controller 11 operates the network analyzer 23, DC power supply 33, and (in FIG. 6) DC ammeter 47. The network analyzer 23 simultaneously transmits and receives an oscillated signal (e.g., a sinusoidal RF signal). The signal generator 25 of the network analyzer 23 transmits the signal via the RF OUT connector and the RF detector 27 receives the signals on the RF IN connector.

The directional coupler 29 is connected to the network analyzer 23 and provides a pass-thru connection. In the embodiment of FIG. 7, a bias-T 31 is connected to the directional coupler 29 which allows the DC signal to be added to the RF signal that is connected to the TEC cable 15 that acts as the conduit for the temperature passive sensor 35 and system impedance match load 37. A noise (band-pass) filter 39 may be used to remove noise that is coupled onto the cable 15. The noise is caused by environmental disturbances.

The DC power supply 33 powers the controller 11 as well as provides a small, measureable current that is used by the downhole passive temperature sensor 35 and system impedance match load 37 for a resistive value measurement.

In the case of passive temperature measurement (see FIG. 7), two diodes are provided downhole in a low pass filter ("LPF") diode switch 49 which serves as an isolation circuit to isolate positive and negative DC current. Positive voltage is applied to the passive temperature sensor 35 and negative voltage is applied to the system impedance match load 37. The purpose of the system impedance match load 37 is to allow removal of cable losses and the DC drop of each diode. The downhole crystal resonant frequency is not affected by the low DC value voltage that is applied to the crystal 41 downhole because of the noise (low pass) filter 39.

In the case of crystal temperature measurement (see FIG. 6), the pressure and temperature crystals 41, 43 are connected in parallel. One lead of the crystals 41, 43 is connected to the shield of TEC cable 15, the other lead of the crystals 41, 43 is connected to the center conductor of the cable 15. This is the preferred and simplest configuration.

When the pressure and temperature crystals 41, 43 are connected in parallel, each resonant frequency can be obtained in one measurement (see FIG. 8), with phase (−180° to) +180° and amplitude (S11 in dB) being measured by the network analyzer 23. Because the crystals 41, 43 are connected in parallel to the cable 15, a sweep of both crystals 41, 43 can be performed at the same time by the network analyzer 23. The resistive impedance of the crystals 41, 43 should be matched as closely as possible to the TEC cable 15 and source impedance to eliminate losses other than resistive losses. More crystals or resonant sensors could be tied into the system to accommodate multiple zones.

Figure 8:
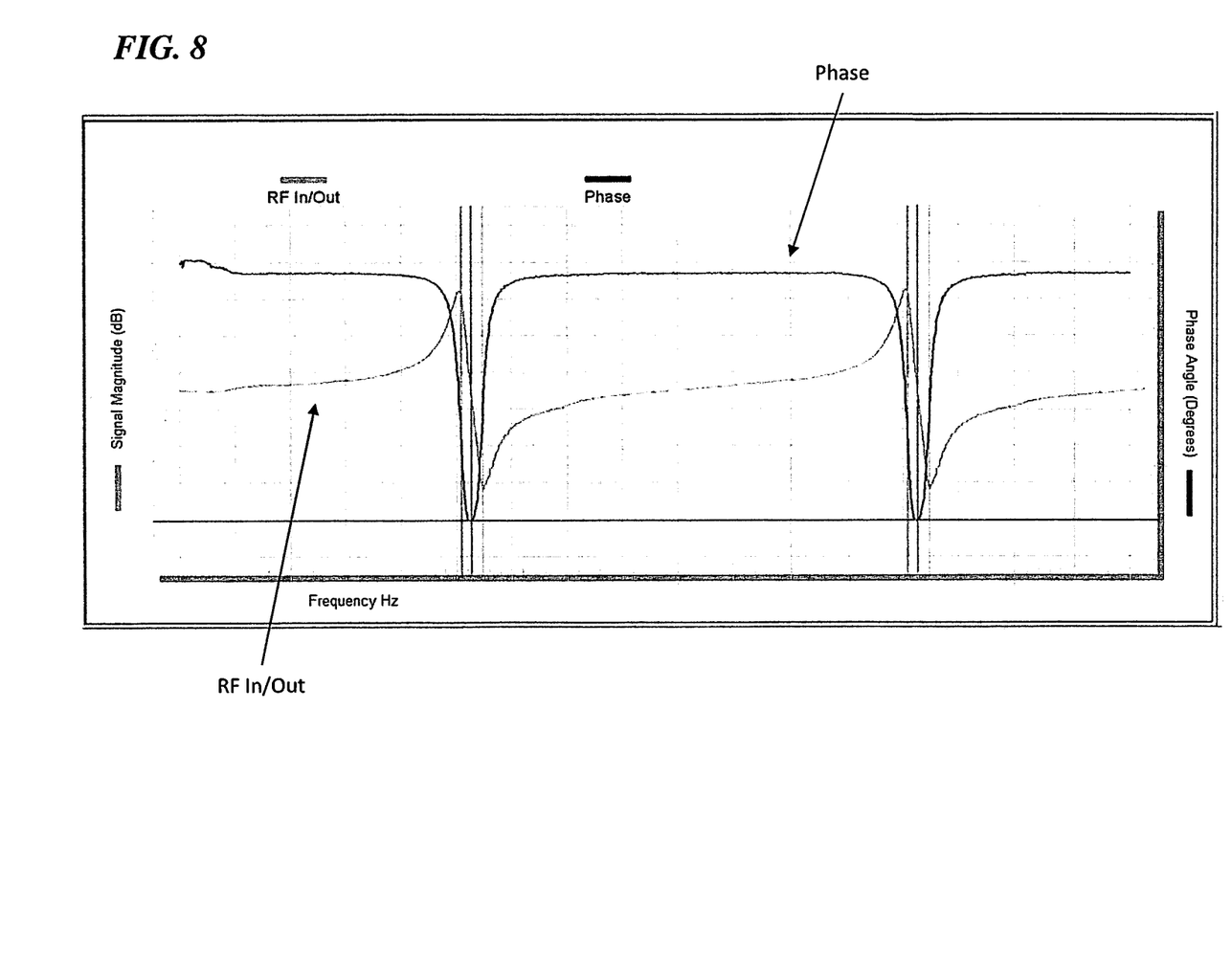
FIG. 8 is a graph of pressure and temperature crystals connected in parallel with each resonance frequency shown in one measurement. A sweep of both crystals is performed at the same time by a network analyzer because the crystals are connected to the same TEC cable. More crystals could be tied into the system to accommodate multiple zones.

Each crystal 41, 43 is selected so that there is no overlap in their modes or harmonics. As illustrated in FIG. 8, the resonant frequency of each crystal 41, 43 is the peak signal, with the peaks being separated from one another. The anti-resonant frequency of each is the location of the negative notch. While not preferred, the anti-resonant frequency can also be used to detect a change in the reflected signal.

System Calibration for the Multi-Conductor Case

Pressure and temperature crystals' resonant frequency magnitude and phase measurements require system calibration or removal of characteristics caused by the transmission line. In the multi-conductor case, system calibration is performed by measurement of the characteristic "load", "short", and "open" values measured by the network analyzer 23. The controller 11 operates the process of measurement and maintains system calibration coefficients in a file for use by the system. The calibration coefficient file is used by the network analyzer to obtain accurate readings.

If a passive temperature sensor 35 is used, a second system calibration is performed. The RTD 35 is connected between one of the conductors 17A-E and the TEC cable shield. The system impedance matched load 37 is used as the calibration element for the passive temperature sensor 35 when measuring resistance to determine temperature downhole.

The above calibrations can be performed if necessary before every measurement is taken.

Because each quartz pressure sensor 41 and quartz temperature sensor 43 is unique, sensor calibration is performed before field use. A polynomial equation is generated for each sensor 41, 43. The frequencies obtained from the downhole sensors 41, 43 are applied to the polynomial equation and converted to appropriate pressures and temperatures which reflect the subterranean well conditions.

Results

Figure 9:
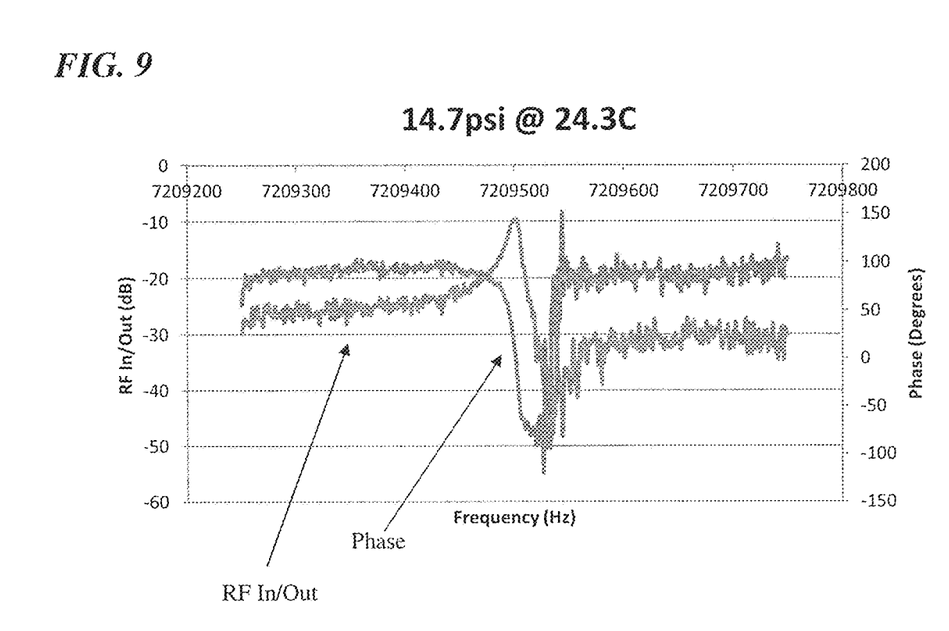
FIG. 9 is a calibrated plot of the pressure crystal reflected frequency response indicating amplitude normalized and phase information of quartz pressure sensor at 14.7 psi (about 101.4 KPa) and 24.3° C. This is an example of the reflected resonance of the crystal.

FIG. 9 is a calibrated plot of the pressure crystal reflected frequency response indicating amplitude normalized and phase information of quartz pressure sensor at 14.7 psi (about 101.4 KPa) and 24.3° C. This is an example of the reflected resonance of the crystal.

Figure 10:
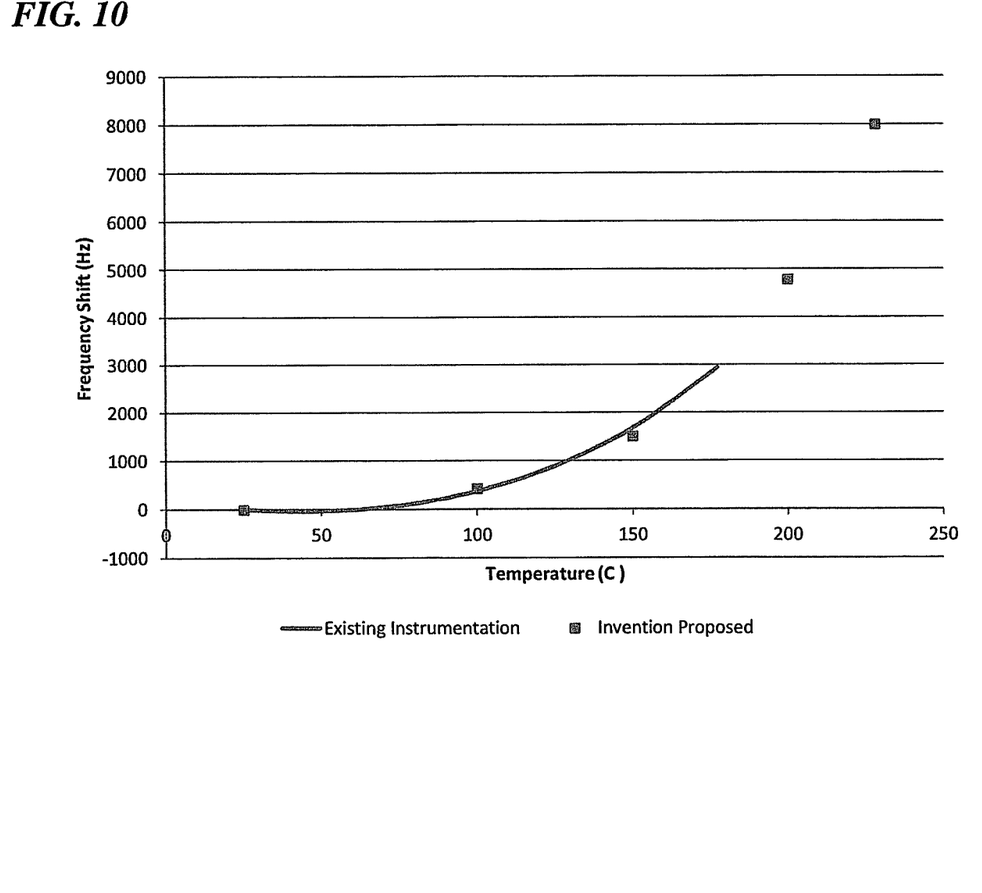
FIG. 10 is a graph showing a comparison of a pressure crystal oscillated signal at atmospheric pressure using existing instrumentation and existing methods and a reflected signal at the same pressure using a preferred embodiment of a system and method made according to this invention through a 2,000 ft long (609.6 m) TEC cable. The accuracy of the system and method performs similar to existing instrumentation.

FIG. 10 is a graph showing a comparison of a pressure crystal oscillated signal at atmospheric pressure using existing instrumentation and existing methods and a reflected signal at the same pressure using a preferred embodiment of a system and method made according to this invention through a 2,000 ft long (609.6 m) TEC cable. The accuracy of the system and method performs similar to existing, prior art instrumentation.

Figure 11:
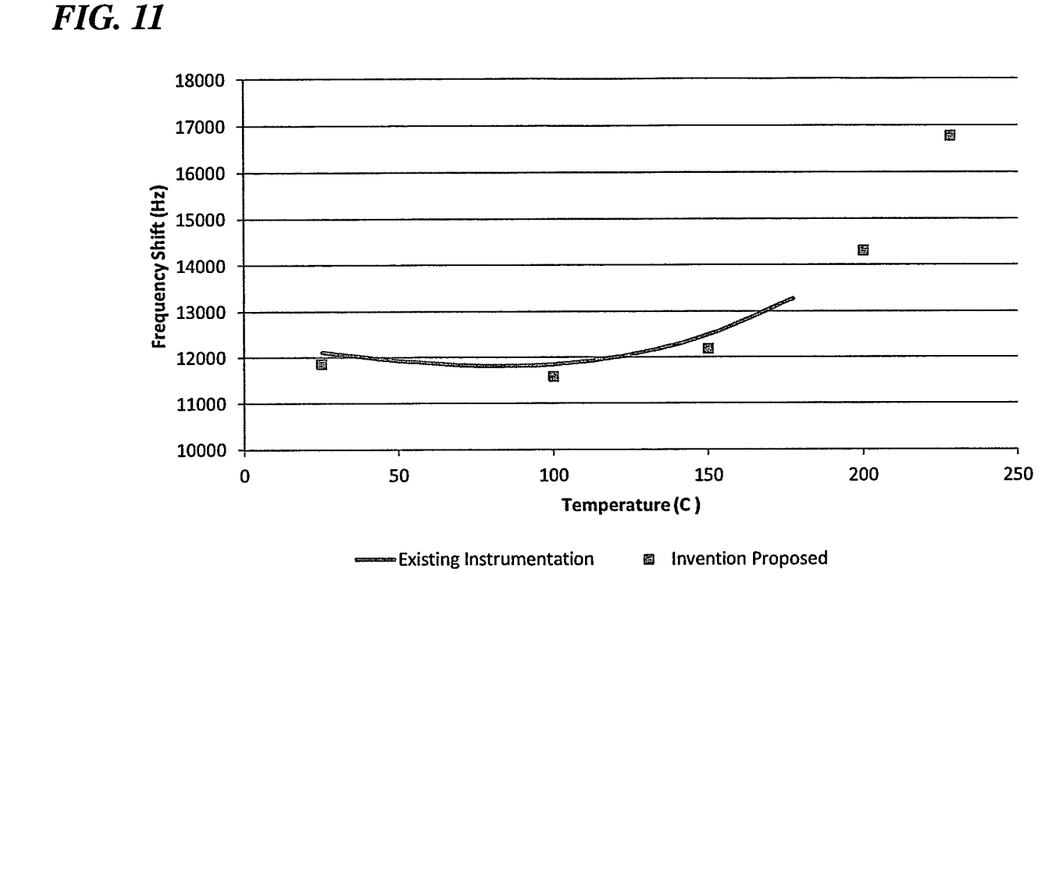
FIG. 11 is a comparison of a pressure crystal oscillated signal at an applied 5,000 psi (about 34.5 MPa) from existing instrumentation using existing methods and a reflected signal at the same pressure using a preferred embodiment of a system and method made according to this invention through a 2,000 ft long (609.6 m) TEC cable. The accuracy of the system and method performs similar to existing instrumentation.

FIG. 11 is a comparison of a pressure crystal oscillated signal at an applied 5,000 psi (about 34.5 MPa) from existing instrumentation using existing methods and a reflected signal at the same pressure using a preferred embodiment of a system and method made according to this invention through a 2,000 ft long (609.6 m) TEC cable. The accuracy of the system and method performs similar to existing, prior art instrumentation.

What is claimed:

1. A system for use in monitoring pressure, temperature, and/or vibration, the system comprising:
   a network analyzer,
   at least one or more independent resonant sensors with unique resonance frequencies located downhole, and
   a transmission line connecting the network analyzer to the at least one resonant sensor, the transmission line being a minimum of a single conductor with a ground at least 100 feet (30.48 m) in length and impedance-controlled to the at least one resonant sensor,
   the network analyzer including an oscillating signal generator and a signal detector, the network analyzer being arranged to:
     apply an incident energy in the form of an oscillating signal along the transmission line connected to the at least one resonant sensor and frequency sweep the oscillating signal from one reference frequency to another reference frequency across the at least one resonant sensor, the expected natural resonance of the at least one resonant sensor being between said reference frequencies;
     simultaneously receive a reflected portion of the incident energy from the at least one resonant sensor being passed back along the transmission line;
     measure a phase and magnitude of the received reflected portion of the incident energy; and
     identify a change in the received reflected portion of the incident energy across the swept frequencies.

2. A system according to claim 1 further comprising means for increasing the reflected portion of the incident energy relative to the applied incident energy.

3. A system according to claim 2 wherein the increasing means is a fixed resister which substantially matches system impedance load.

4. A system according to claim 1 further comprising a second resonant sensor.

5. A system according to claim 4 wherein the at least one resonant sensor and the second resonant sensor are connected in parallel.

6. A system according to claim 4 wherein the network analyzer sweeps the at least one resonant sensor and the second resonant sensor at the same time.

7. A system according to claim 4 wherein the at least one resonant sensor and the second resonant sensor are separated by the transmission line or a network filter.

8. A system according to claim 7 wherein the reflected portion of the incident energy includes a reverse transmission energy.

9. A system according to claim 7 further comprising an isolation circuit located between the passive temperature sensor and the at least one resonant sensor.

10. A system according to claim 1 further comprising a passive temperature sensor, the passive temperature sensor being connected to the network analyzer by the transmission line.

11. A system according to claim 1 wherein the oscillating signal is an LF or higher sinusoidal signal generated by a signal generator.

12. A system according to claim 1 wherein the at least one resonant sensor is a quartz pressure crystal or a quartz temperature crystal.

13. A method of monitoring pressure, temperature, and/or vibration, the method comprising the steps of:
   applying an incident energy in the form of an oscillating signal along a transmission line connected to at least one resonant sensor located downhole, the applying step frequency sweeping the oscillating signal from one reference frequency to another reference frequency across the at least one resonant sensor with the expected natural resonance of the at least one resonant sensor being between the two reference frequencies;
   simultaneously receiving a reflected portion of the incident energy from the at least one resonant sensor being passed back along the transmission line;
   measuring a phase and magnitude of the received reflected portion of the incident energy; and
   identifying a change in the received reflected portion of the incident energy across the swept frequencies;
   wherein the applying, receiving, measuring, and identifying steps are performed by a network analyzer, the network analyzer including an oscillating signal generator and a signal detector, the transmission line connecting the network analyzer to the at least one resonant sensor being a minimum of a single conductor with a ground at least 100 feet (30.48 m) in length and impedance-controlled to the at least one resonant sensor.

14. A method according to claim 13 further comprising the step of increasing the reflected portion of the incident energy relative to the applied incident energy by matching a system impedance load of the at least one resonant sensor.

15. A method according to claim 13 further comprising a second resonant sensor, the network analyzer performing the applying, receiving, measuring, and identifying steps on the second resonant sensor.

16. A method according to claim 15 wherein the at least one resonant sensor and the second resonant sensor are swept by the network analyzer at the same time.

17. A system according to claim 15 wherein the at least one resonant sensor and the second resonant sensor are separated by the transmission line or a network filter.

18. A method according to claim 17 wherein the reflected portion of the incident energy includes a reverse transmission energy.

19. A method according to claim 13 wherein a second sensor is a passive temperature sensor connected to the network analyzer by the transmission line.

20. A method according to claim 19 wherein an isolation circuit is located between the passive temperature sensor and the at least one resonant sensor.

21. A method according to claim 13 wherein the oscillating signal is an LF or higher sinusoidal signal generated by a signal generator.

22. A method according to claim 13 wherein the at least one resonant sensor is a quartz pressure crystal or a quartz temperature crystal.

* * * * *